United States Patent [19]

Gehri

[11] Patent Number: 4,495,145
[45] Date of Patent: Jan. 22, 1985

[54] SPHERICAL NUCLEAR FUEL LOADING PROBE

[75] Inventor: Aime A. Gehri, Richland, Wash.

[73] Assignee: Exxon Nuclear Company, Inc., Bellevue, Wash.

[21] Appl. No.: 327,816

[22] Filed: Dec. 7, 1981

[51] Int. Cl.³ ............... G21C 5/36; B67D 5/08; G21G 13/00; G01G 17/04
[52] U.S. Cl. .................. 376/261; 376/265; 141/286; 222/77
[58] Field of Search ............... 141/286, 374; 222/77, 222/132; 29/400 W; 376/265, 382, 381, 419, 430, 428, 261

[56] References Cited

U.S. PATENT DOCUMENTS

| 2,724,535 | 11/1955 | Day et al. | 141/286 |
| 2,867,247 | 1/1959 | Aldridge | 141/286 |
| 2,983,658 | 5/1961 | Hyman et al. | 376/265 |
| 3,089,830 | 5/1963 | McGeary et al. | 29/400 W |
| 3,778,348 | 12/1973 | Sease et al. | 376/430 |
| 3,788,368 | 1/1974 | Geng et al. | 141/286 |
| 4,111,335 | 9/1978 | Arya et al. | 222/77 |
| 4,312,709 | 1/1982 | Schror et al. | 376/381 |

Primary Examiner—Sal Cangialosi
Attorney, Agent, or Firm—Ronald D. Hantman

[57] ABSTRACT

A feeding apparatus for the loading of the spherical nuclear fuel into a fuel rod. The apparatus feeds fuel of three different diameters into a fuel rod so that the three different sized spheres are appropriately packed to achieve sufficient density of fuel to be used in a nuclear reactor.

6 Claims, 11 Drawing Figures 4,495,145

SPHERICAL NUCLEAR FUEL LOADING PROBE

BACKGROUND OF THE INVENTION

The present invention relates to the loading of fuel rods with spherical nuclear fuel.

In recent years it has been discovered that conventional nuclear reaction fuel composed of fuel pellets encased in cladding tubes may lead to the splitting of the cladding tubes thereby releasing radioactive material to the adjacent cooling water. This splitting is due to an interaction between the pellet and cladding. One way of avoiding this problem is to limit the surface interaction between the fuel and cladding. This may be achieved by loading the fuel cladding tubes with nuclear fuel in the shape of spheres. If three different sizes of spheres are used, than appropriate packing of the spheres into the rods will result in a sufficient density of nuclear fuel to be properly used in a nuclear reactor.

One method for loading a fuel rod is to simply drop the spheres into a vertical cladding tube while vibrating the rod to assist in packing. However, this method is not satisfactory for several reasons. The distribution of the particles sizes freely falling from a height of 6 to 12 feet into a cladding tube does not lead to uniform distribution. This method also leads to the trapping of air which requires a longer time to evacuate at the sealing of the tube. In addition, the vibrating packing is extended because of the random loading of the spheres.

SUMMARY OF THE INVENTION

The invention is a loading probe for the loading of spherical nuclear fuel into a fuel rod. The probe includes a funnel means for receiving the spherical nuclear fuel, the funnel means maintaining a separation of the spherical fuel of different diameters; tubing means corresponding to each of the spherical nuclear fuel diameters, the tubing means of sufficient length so that one end of the tubing means extends about the length of the fuel rod in the load portion; valve means for releasably containing the fuel spheres within said funnel means, said valve means able to release the fuel spheres to the tubing means; gate means between the valve means and the tubing means for regulating the rate of flow of each the spherical fuel as it passes from the funnel means through the valve means into the end of the tubing means away from the fuel rod; and deflector means attached to the end of the tubing means within the fuel rod for mixing the fuel as it emerges from the tubing means;

DESCRIPTION OF THE PREFERRED EMBODIMENT

Figure 1:
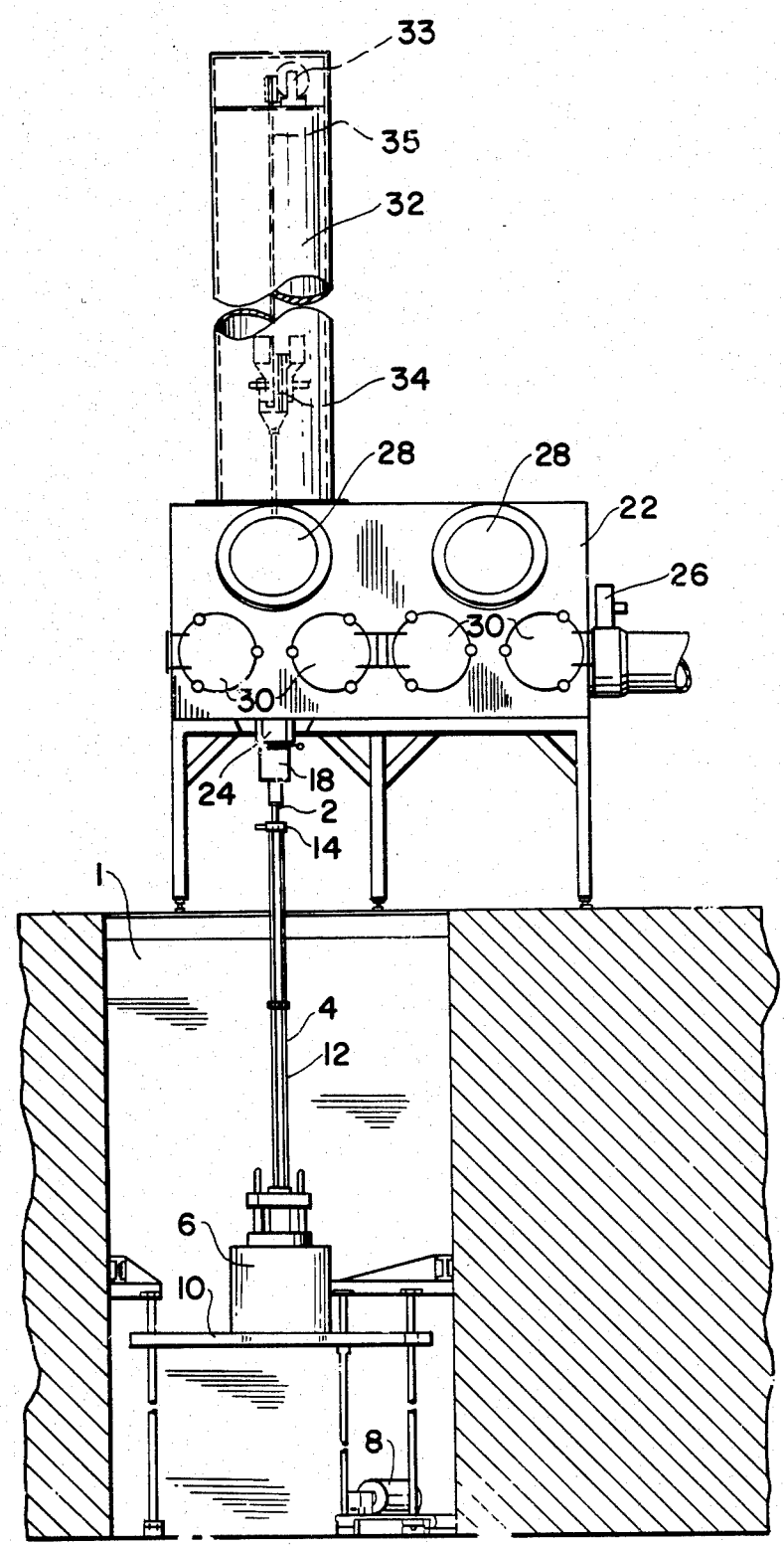
FIG. 1 shows an elevated view of the system viewed from the front.
Figure 2:
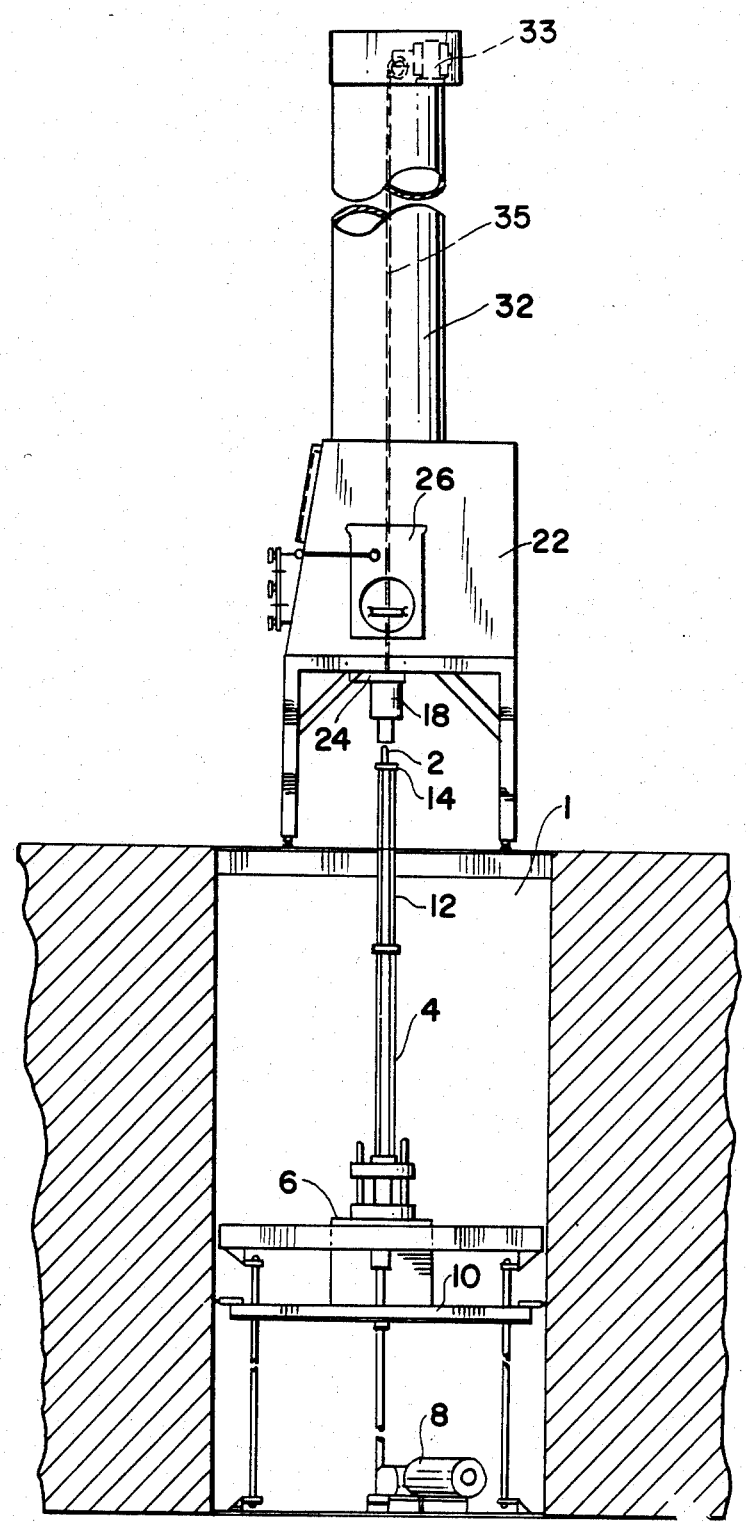
FIG. 2 shows an elevated view of the system viewed from the side.
Figure 3:
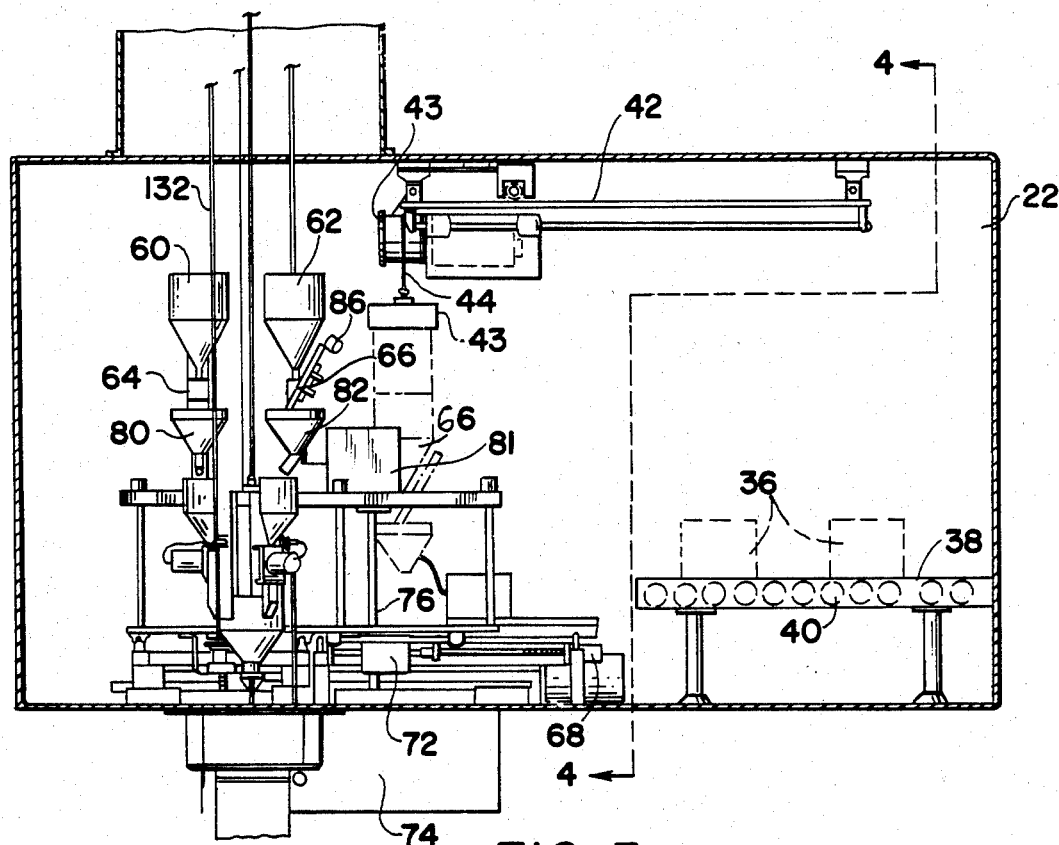
FIG. 3 shows the interior of the glovebox viewed from the front.

The present invention is a loading probe for loading nuclear fuel rods with spherical nuclear fuel. The probe is part of an overall loading system described in copending application Ser. No. 327,817 entitled "Spherical Nuclear Fuel System" filed on Dec. 7, 1981 by the same inventor and assigned to the same assignee as the present application and incorporated herein by reference. The overall system is shown in FIGS. 1 and 3. FIG. 1 shows the system viewed from the front. A fuel cladding rod 2 to be loaded with fuel is held vertically upright by a fuel rod support clamp 4. Because of the length of the fuel rods 2, the rods 2 may be set in pit 1 in the building floor. The support clamp 4 is fixed to a vibrator 6 driven by vibrator motor 8. The vibrator 6 rests on a frame 10. The frame 10 is vertically adjustable to give the vibrator 6 a vertical travel of several feet. This allows the loading system to accomodate fuel cladding rods 2 of different lengths.

The open upper end of the fuel cladding tube 2 is attached to an adaptor 18 with an airtight connection. The adaptor 18 is mounted to the glove box 22 via a bellows arrangement so that the fuel tube 2 is flexibly mounted to the glove box 22 allowing the fuel tube 2 to vibrate in response to the vibrator 6 while the tube is being loaded. The adaptor 18 is connected to the glove box 22 with a vacuum valve 24 so that the adaptor 18 and fuel tube 2 combination may be isolated from the glove box 22 forming an airtight combination.

The glove box 22 is an enclosure capable of being made airtight which receives the nuclear fuel through the entrance vacuum valve 26. The glove box includes windows 28 and hinged glove box covers 30. Opening the glove box covers 30 reveals gloves (not shown) mounted to the glove box 22 which allows the operator to accomplish manipulation within the glove box 22 while still retaining the inert atmosphere within the glove box 22. On the upper side and connected to the glove box 22 is the rod loading assembly cover 32. The rod loading assembly cover 32 is of sufficient length to allow the rod loading assembly 34 to rise high enough so that it is free of the fuel cladding tube 2. FIG. 3 shows a side view of the glove box and fuel cladding tube assembly.

Figure 4:
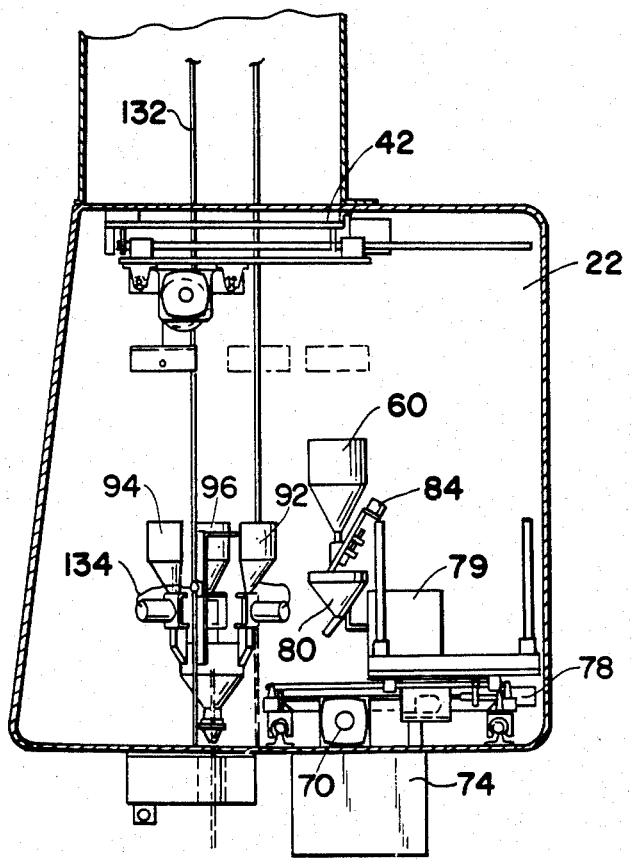
FIG. 4 shows the interior of the glovebox viewed from the side with the fines weighing station in the load position.
Figure 5:
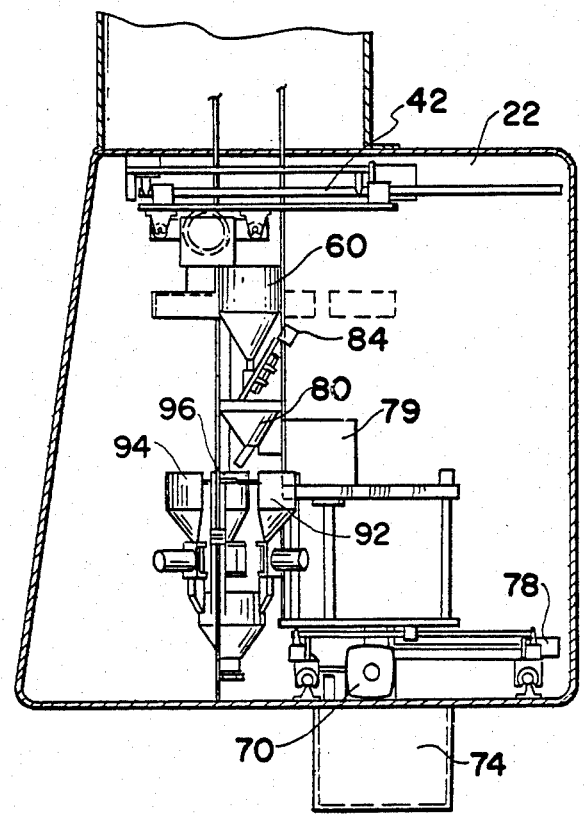
FIG. 5 shows the interior of the glovebox viewed from the side with the fines weighing station in the dump position.

After entering the glove box through the vacuum valve 26, the fuel proceeds to the weighing station. Referring to FIGS. 3, 4, and 5 shows the passage of the spherical nuclear fuel from the entrance vacuum valve 26 to the loading hoppers 60 and 62 of the weighing stations. The nuclear fuel spheres enter the glove box 22 through the entrance vacuum valve 26 in containers large enough to hold sufficient fuel for about six fuel tubes 2. The fuel containers 36 indicated by the dotted lines, move along the rollers 40 of the transport conveyor 38, which may be powered or non-powered. After coming to rest on the conveyor 38, the fuel is lifted vertically upward by the overhead transport system 42. The over head transport system 42 is capable of lifting the fuel container 36 from the transport conveyor 38 and moving it from right to left and back and forth within the glove box 22. The overhead transport conveyor 38 includes a rotating drum 43 around which is wrapped a cord 44 for raising and lowering the spheres. The containers 36 are moved one at a time from the transport conveyor 38 to the loading hoppers 60 and 62 of the weighing scales. In the preferred embodiment, three sizes of spheres are used, which are referred to herein as fines, mediums and large. There are three weighing stations, one corresponding to each of the sphere sizes. However, only two of the weighing stations, the fines 64 and mediums 66 are shown for clarity. The mediums weighing station 66 is shown in FIG. 3 by the dotted figure in the load position for receiving fuel. The fuel container 36 are attached to the transport lid 43 and moved by the overhead transport system 42 to each of the weighing stations where the fuel spheres are deposited into the hoppers 60 and 62 of the scales.

The mediums 65 and large 66 weighing stations are mounted on one platform and move from side to side by the drive motor 68. In addition, the weighing stations move up and down by the drive mechanism 72, the glove box 22 providing a recess 74 for the support shaft 76 when the station is lowered. The fines weighing station 64 moves front to back driven by the drive motor 78 within the glove box 22 as well as side to side motion driven by motor 70.

As noted above, the mediums 66 and large 65 weighing stations are mounted on one platform moved toward the glove box opening for loading. In addition, the weighing stations loading hoppers 61 and 62 are lowered to accommodate the fuel containers 36 which are moved to the weighing stations by the overhead fuel transport 42. The fines weighing system 64 is mounted independently of weighing stations 65 and 66 and moves toward the back of the glove box 22, then to the right and down for loading. The fuel spheres containers 36 are picked up by the overhead transport system 42 and positioned on top of the weighing station hoppers. The spheres are released into the loading hoppers 60, 61 and 62. Spheres of each size are dropped into the weighing scales hoppers 80 and 82 in incremental amounts by the stepper motors 84 and 86. When predetermined amounts of fuel spheres are received by the scale hoppers 80 and 82 as indicated by the weighing means 79 and 81 the flow ceases (Recall only two of the three weighing scales are shown in the Figures). These predetermined amounts of fuel spheres are sufficient to fill one fuel rod 2. These fuel spheres are then transferred to the hoppers 92, 94, and 96 of the feeding probe 34.

Figure 6:
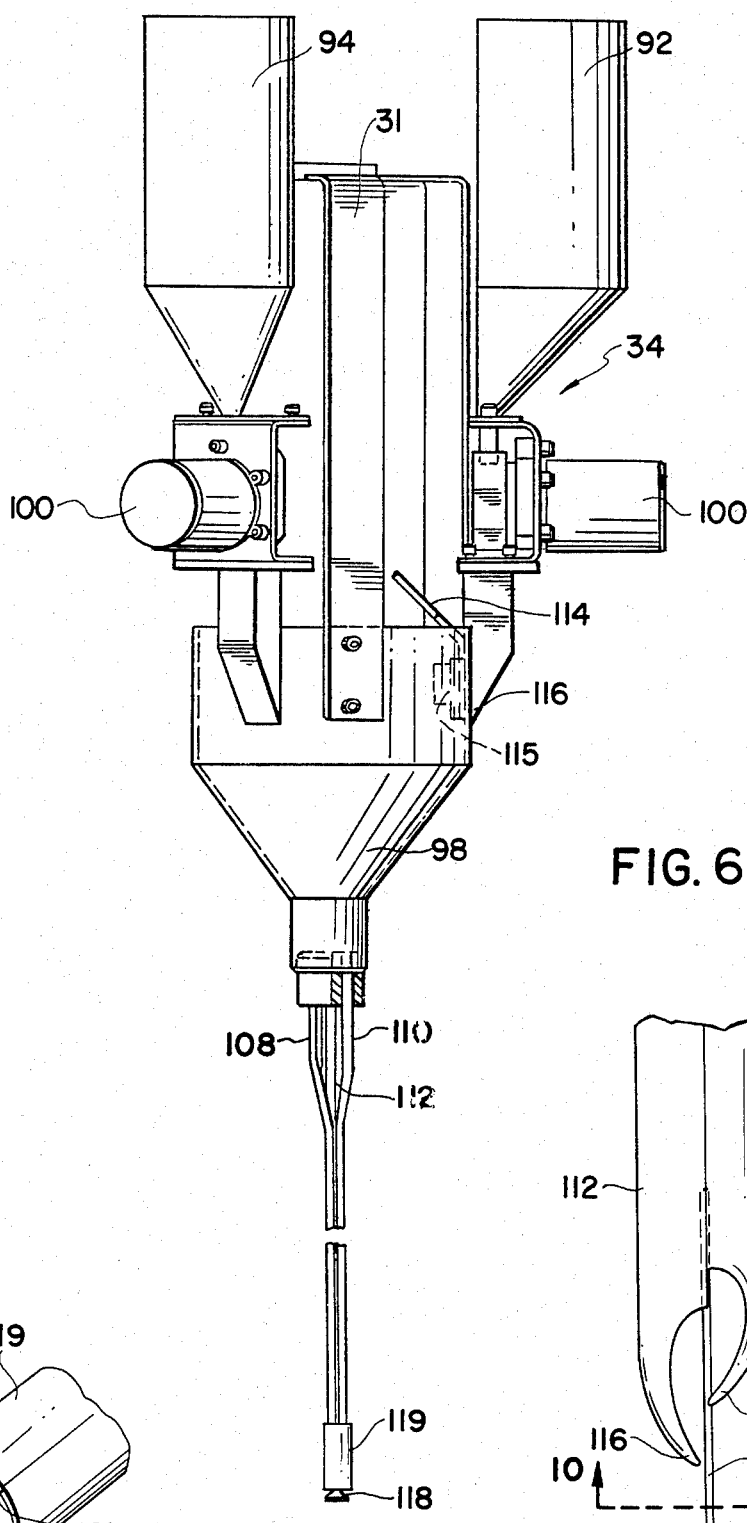
FIG. 6 shows an elevated view of the feeding probe.
Figure 9:
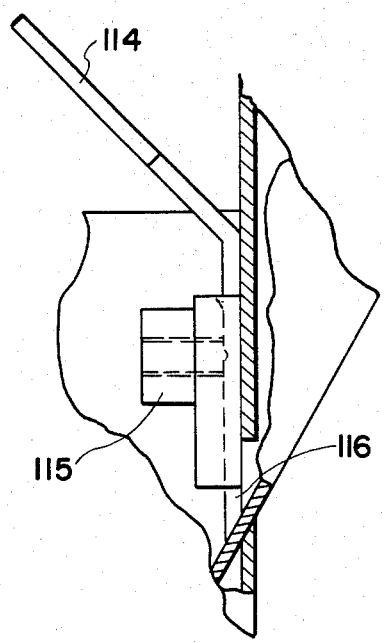
FIG. 9 shows a cross-sectional view of the regulator gate arrangement of the feeding probe.
Figure 11:
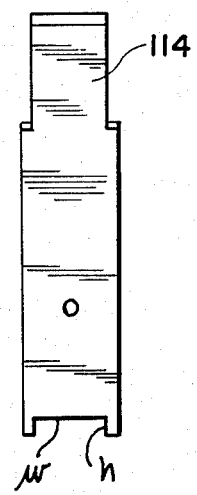
FIG. 11 shows the regulator gate.

The feeding probe 34 is a device for depositing the three different sizes of spheres into the fuel rod 2 in a controlled manner so that the correct uniform density is achieved in the rod 2. Referring to FIGS. 4 and 6, the probe 34 includes three funnels 92, 94 and 96 into which each of the three quantities of fuel is discharged from the weighing scale hoppers 80, 81 and 82. In FIG. 6, only two 92 and 94 of the three funnels are shown for clarity. The funnels are spaced about 60° apart and are all identical except for the ability to accommodate different sized spherical fuel. The three funnels 92, 94 and 96 are connected to the probe hopper 98 via three solenoid valves 100. There is one solenoid valve 100 for each funnel. The probe hopper 98 is divided into three sections 102, 104 and 106. The fuel spheres, after being released by the solenoid valves 100, pass through a regulator gate 114 shown in FIG. 9. The gate 114 is releasably attached by conventional ball plunger means 115 to the hopper 98 so as to restrict the passage-way 116 connecting the funnels 92 to the sections 102, 104 and 106 of the probe hopper 98. Referring to FIG. 11, the gate 114 includes an opening of height h and width w. These dimensions are selected according to the size of nuclear fuel spheres and the desired rate of flow into the probe hopper 98. The rate of flow of each of the fuel spheres is determined so that upon emergence from the probe 34 within the fuel rod 2, the maximum randomness of the three different size spheres is achieved.

The probe hopper is connected to tubing 108, 110 and 112. Each of these tubes corresponds to one of the sections of the probe hopper 98 which, in turn, corresponds to one of the funnels 92, 94 and 96. In the particular embodiment shown in FIGS. 6 and 10, two of the tubes 108 and 110 are of the same circular cross-section. These tubes are used for the two smallest diameter fuel. The largest fuel sphere is carried by the tube 112 of elliptical cross section.

Figure 8:
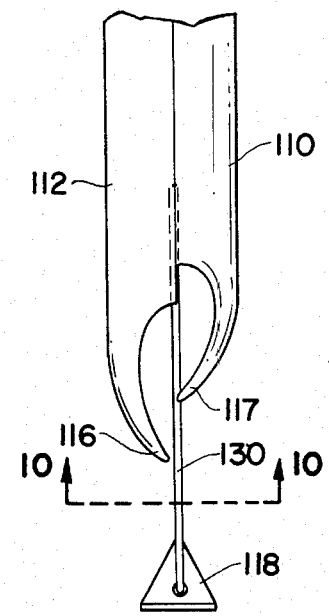
FIG. 8 shows an alternative embodiment of the lower end of the feeding probe.
Figure 10:
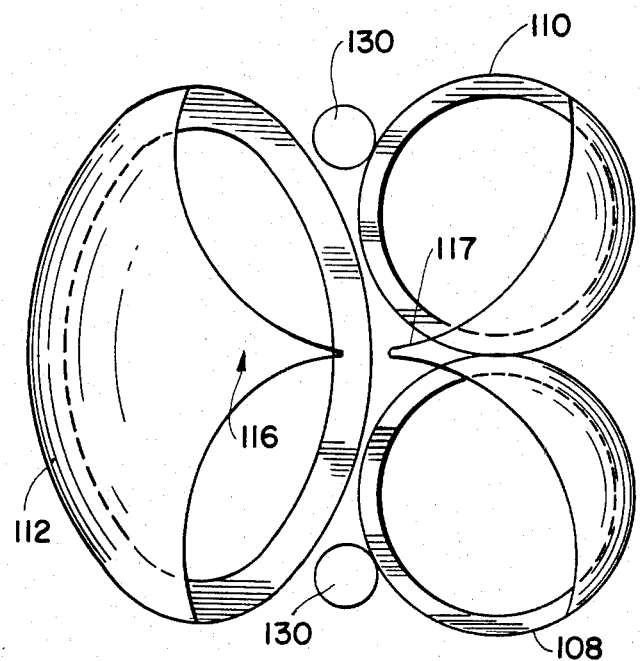
FIG. 10 shows the cross-section of lower end of the feeding probe of one embodiment viewed along 10—10 of FIG. 8.

The outer surface of lower end of each of the tubes 108, 110 and 112 is extended into scoops as shown in FIGS. 8 and 10. The scoop shaped extensions terminate into points 116 and 117 toward the axis through the center of the three tubed arrangement. The extensions of tubes 108 and 110 for the two smaller tubes join together to form one common point 117. These extensions help in the mixing of the fuel spheres to provide a random distribution of packing of the fuel tube. To further enhance the randomness of distribution of the three different sized spheres and improve the uniformity of packing of the fuel rod 2, a cone shaped piece 118 is fixed to the lower end of the fuel tubes 108, 110 and 112 by two cylindrical rod members 130 as shown in FIG. 8. The cone 118 is fixed to the rods 130 by conventional means.

Figure 7:
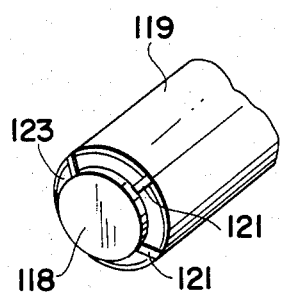
FIG. 7 shows the lower end of the feeding probe.

Alternatively, as shown in FIGS. 6 and 7, the cone 118 may be fixed to the lower end of the fuel tubes 108, 110, and 112 by a cylindrical collar 119. The collar overlaps and is welded to the lower end of the fuel tubes. The cone 118 is fixed to the other end of the collar 118 with the point of the cone 118 along the axis of the collar and pointed toward the probe 34. The cone 118 is welded at several points 121 but leaving a gap 123 between the cone 118 and collar 119 so that the fuel spheres may emerge from the probe 34.

After the probe is loaded, the weighing stations are moved out of the way of the fuel feeding probe 90 and the solenoid valves 100 are opened. The fuel spheres descend through the valve 100, the regulator gate 114 and the tubing 108, 110 and 112. As the fuel reaches the bottom of the fuel rod 2, the probe 90 is raised at a rate so that the bottom of the fuel probe 90 remains just above the ascending fuel column. That is, the spheres are deposited on top of the fuel column such that the end of the probe remains between about 1 and 5 in above the ascending fuel column. The probe 34 is raised and lowered by means 33 through a cable 35 attached to Bracket 31 of the probe 34. Copper tubes 132 guide the feeding probe 90 up and down. The copper tubes 132 in combination with wires 134 provide the electrical contact to operate the solenoids 100.

The vibrator 6 is in operation while the fuel rod 2 is being loaded. After the loading is completed and feeding probe 90 is clear of the fuel rod 2, the rod is removed from the support clamp 4. A new fuel rod is placed in the clamp 4 and process is started again.

EXAMPLE

For fuel spheres having diameters 30 μm, 200 μm, and 1200 μm, the dimensions for the opening in the regulator gate is d=0.504 for all three gates and h=0.020 in, 0.032 in and 0.1 in.

I claim:

1. A loading probe for loading spherical nuclear fuel of three different diameters into a fuel rod comprising:
   (a) funnel means for receiving said spherical nuclear fuel, said funnel means maintaining a separation of said spherical fuel of different diameters;
   (b) tubing means corresponding to each of said spherical nuclear fuel diameters, said tubing means of sufficient length so that said tubing means extends about the length of said fuel rod in the load portion;
   (c) valve means for releasably containing said fuel spheres within said funnel means, said valve means able to release said fuel spheres to said tubing means;
   (d) gate means between said valve means and said tubing means for regulating the rate of flow of each said spherical fuel as it passes from said funnel means through said valve means into the end of said tubing means away from said fuel rod; and
   (e) deflector means attached to said end of said tubing means within said fuel rod for mixing said fuel as it emerges from said tubing means;

2. The probe of claim 1 wherein said valve means are solenoid valves.

3. The probe of claim 1 wherein said tubing means includes:
   (a) three tubes aligned longitudinally each one tube corresponding to each of said diameters of nuclear fuel spheres, and
   (b) a hopper divided into three sections, one end of each of said three tubes connected to a corresponding one of said three sections of said hopper, each section of said hopper adacent to a corresponding gate means.

4. The probe of claim 3 wherein said deflector means includes:
   (a) scoop shaped extensions of each of said tube ends toward said fuel rod,
   (b) a tubular collar aligned along the axis of said three tubes, one end of said collar surrounding scoop shaped extensions on said tube ends so that said fuel emerges within said collar as it leaves said tubes, and
   (c) a cone axically alligned with the axis of said tubes fixed to the other end of said collar so that a space exists between said cone and the periphery of said other end of said collar, the point of said cone directed along the axis of said collar toward said scoops, said space sufficient to allow said fuel spheres to pass and enter said fuel rod.

5. The probe of claim 3 wherein said deflector means includes:
   (a) scoop shaped extensions of each of said tube ends toward said fuel rod,
   (b) a cone axially aligned with the axis of said tubes, fixed to scoop end of said tubes by two rods, one end of said rods fixed to said tubes and the other end of said rods fixed to said cone, the point of said cone toward said tubes.

6. The probe of claim 1 wherein said gate means includes three V-shaped members releasably attached, one member corresponding to each of said fuel sphere diameters, each of said members including an opening whose dimensions are chosen so as to achieve sufficient density of fuel in said fuel rod to operate in a nuclear reactor.

* * * * *